United States Patent
Yamane et al.

(10) Patent No.: US 6,497,044 B2
(45) Date of Patent: Dec. 24, 2002

(54) CUTTING BLADE COVER FOR BRUSH CUTTER

(75) Inventors: Yoshiro Yamane, Akashi (JP); Tadao Yashirodai, Kakogawa (JP); Kazuhiko Takemoto, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 198 days.

(21) Appl. No.: 09/727,267

(22) Filed: Nov. 30, 2000

(65) Prior Publication Data

US 2001/0002516 A1 Jun. 7, 2001

(30) Foreign Application Priority Data

Dec. 2, 1999 (JP) ............................................ 11-343199

(51) Int. Cl.$^7$ ............................................... B26B 29/00
(52) U.S. Cl. ........................... 30/286; 150/154; 206/349
(58) Field of Search ......................... 30/286, 151, 514, 30/539, 540; 150/154, 161; 206/349

(56) References Cited

U.S. PATENT DOCUMENTS

| 2,918,165 | A | * | 12/1959 | Paulick, Jr. | .................. | 150/154 |
| 3,277,571 | A | * | 10/1966 | Bollmfield | .................. | 30/540 |
| 3,290,778 | A | * | 12/1966 | Hickerson | .................. | 30/540 |
| 4,306,600 | A | | 12/1981 | Lonsinger, Jr. | | |
| 6,205,668 | B1 | * | 3/2001 | Fournier, Jr. | .................. | 30/286 |
| 6,267,239 | B1 | * | 7/2001 | Maki | ........................... | 206/349 |

FOREIGN PATENT DOCUMENTS

| DE | 620201 | 10/1935 |
| DE | 91 12 271 | 2/1992 |
| EP | 0324322 | 7/1989 |
| JP | 63-56213 | 3/1963 |

* cited by examiner

*Primary Examiner*—Hwei-Slu Payer
(74) *Attorney, Agent, or Firm*—Oppenheimer Wolff & Donnelly LLP

(57) ABSTRACT

A cutting blade cover for a brush cutter comprises a central portion (50), a first blade accommodating portion (28), a second blade accommodating portion (29), and a third blade accommodating portion (30). The first, second, and third blade accommodating portions (28, 29, 30) are provided radially from the central portion (50). The first blade accommodating portion (28) includes a first concave portion (31). The second blade accommodating portion (29) includes a second concave portion (36). The third blade accommodating portion (30) includes a third concave portion (40). The first concave portion 31 has an inner shape conforming to an outer shape of the first blade (17) to cover an outer periphery of the first blade (17). The second concave portion (36) has an inner shape conforming to an outer shape of the second blade (18) to cover an outer periphery of the second blade (18). The third concave portion (40) has an inner shape conforming to an outer shape of the third blade (19) to cover an outer periphery of the third blade (19). The central portion (50) has a central through hole (44). The first blade accommodating portion (28) includes a slit (33). The slit (33) extends from an outer end of the first blade accommodating portion (28) to the central through hole (44).

14 Claims, 4 Drawing Sheets

CUTTING BLADE COVER FOR BRUSH CUTTER

BACKGROUND OF THE INVENTION

1. Field of the Invention

The present invention relates to a cover for a cutting blade used in a brush cutter.

2. Description of the Related Art

Conventionally, a brush cutter has been used for works such as mowing or cutting of small branches. FIG. 6 shows an example of such a brush cutter. Referring to FIG. 6, a brush cutter 1 is provided with a three lobe cutting blade 3 at a tip end of a rod 14. The three lobe cutting blade 3 includes three blades radially extended from a base portion thereof. In the brush cutter 1, the cutting blade 3 is rotated by an engine (or motor) 2 to reap grasses, trees, and the like.

When work is completed or a work place is changed, it is necessary to transfer or carry the brush cutter 1. In this case, when the cutting blade 3 makes contact with very hard things such as rocks, a cutting portion of the blade 3 might be damaged. To avoid this, a cutting blade cover is generally attached to the cutting blade 3 when the brush cutter 1 is transferred or carried. For example, a cutting blade cover 4 shown in FIG. 7 is attached to the cutting blade 3.

Referring to FIG. 7, the cutting blade cover 4 comprises a circular base plate 5 and a push rod 6 rotatably attached to the base plate 5. The cutting blade cover 4 is attached to the cutting blade 3 according to the following procedure. First, the base plate 5 is brought into abutment with the cutting blade 3 from below of the cutting blade 3. In this state, then, the push rod 6 is rotated around a pivot 8 with respect to the base plate 5 and then engages with a hook 9 provided on the base plate 5. Thereby, the cutting blade 3 is sandwiched between the base plate 5 and the push rod 6 and the cutting blade cover 4 is attached to the cutting blade 3.

However, the following problems arise when the conventional cutting blade cover 4 is applied to the three lobe cutting blade 3.

The cutting blade three lobe shaped, while the base plate 5 of the cutting blade cover 4 is a circular flat plate. Therefore, with the cutting blade cover 4 attached to the cutting blade 3, the base portion 5 of the cutting blade cover 4 is only contact with a lower face of the cutting blade 3 and an outer periphery of the cutting blade 3 is exposed. Consequently, cutting portions of the cutting blade 3 are not sufficiently protected.

In addition, since the cutting blade 3 is pushed against the base plate 5 by means of the push rod 6 to be fixed to the base plate 5, play tends to occur and the cutting blade cover 4 is apt to be detached from the blade 3, which requires careful handling.

SUMMARY OF THE INVENTION

The present invention has been developed for the purpose of obviating the above-described problems and it is an object of the present invention to provide a cutting blade cover for a brush cutter that is capable of reliably protecting a three lobe cutting blade when the brush cutter is transferred or carried.

According to an aspect of the present invention, there is provided a cutting blade cover for a brush cutter for protecting a three lobe cutting blade including a base portion attached to a rotating shaft of the brush cutter, a first blade, a second blade, and a third blade, wherein the first, second and third blades are protruded radially from the base portion, comprising: a central portion having a central through hole; a first blade accommodating portion; a second blade accommodating portion; and a third blade accommodating portion, wherein the first, second, and third blade accommodating portions are provided radially from the central portion, a first concave portion is formed in the first blade accommodating portion and has an inner shape conforming to an outer shape of the first blade to cover an outer periphery of a cutting portion of the first blade, a second concave portion is formed in the second blade accommodating portion and has an inner shape conforming to an outer shape of the second blade to cover an outer periphery of a cutting portion of the second blade, a third concave portion is formed in the third blade accommodating portion and has an inner shape conforming to an outer shape of the third blade to cover an outer periphery of a cutting portion of the third blade, and the first blade accommodating portion includes a slit extending from an outer end thereof to the central through hole to widen the first concave portion.

With such a configuration, in order to laterally widen the first blade accommodating portion, a force is exerted to cause the slit to be opened, and the first concave portion can be thereby widened. In this state, the second blade and the third blade of the cutting blade are respectively fitted into the second concave portion and the third concave portion from a direction of the first concave portion. Then, the first blade of the cutting blade is inserted into the first concave portion and the force being exerted on the first blade accommodating portion is released to cause the slit to be closed, so that the first concave portion returns to its initial state. Thereby, the first blade is fitted into the first concave portion. Alternatively, the following procedure may be employed. First, the second blade and the third blade are respectively fitted into the second concave portion and third concave portion. Then, in order to laterally widen the first blade accommodating portion, the force is exerted to cause the slit to be opened and the first concave portion can be thereby widened. In this state, the first blade is fitted into the first concave portion. Then, the force being exerted on the first blade accommodating portion is released to cause the slit to be closed and the first concave portion returns to its initial state.

Since the first, second, and third concave portions have the inner shapes respectively conforming to the outer shapes of the first, second, and third blades, the respective blades can be fittingly covered by the respective concave portions. Further, the cutting blade cover is easily attachable/detachable to/from the cutting blade.

It is preferable that the first blade accommodating portion is provided with a pair of engagement portions protruded inwardly of the first concave portion from a side wall face of the first concave portion and apart from a bottom wall face of the first concave portion, for holding the first blade.

It is preferable that the first blade accommodating portion is provided with a pair of handles on both sides of outside of the first blade accommodating portion, for opening the slit, the slit being situated between the handles.

It is preferable that the central through hole has a cutout formed in an inner wall face of the central through hole at a position opposite to a position at which the slit communicates with the central through hole.

It is preferable that the second blade accommodating portion has a bag-shaped portion at an outer end of the second concave portion, for holding the second blade.

It is preferable that the central portion, the first blade accommodating portion, the second blade accommodating portion, and the third blade accommodating portion are made of resin and integrally formed by blow molding.

With such a configuration, the first, second, and third concave portions can be easily formed. In particular, the blow molding makes an outer peripheral face of the cutting blade cover for the brush cutter smooth and makes it possible to manufacture the cutting blade cover that is lightweight, superior in strength and impact resistance, and constituted by a single member at a low cost.

It is preferable that the central portion, the first blade accommodating portion, the second blade accommodating portion, and the third blade accommodating portion respectively have hollow portions inside thereof, the hollow portions communicating with one another.

These objects as well as other objects, features and advantages of the invention will become more apparent to those skilled in the art from the following description with reference to the accompanying drawings.

DETAILED DESCRIPTION OF THE PREFERRED EMBODIMENTS

Preferred embodiments of the present invention will be described with reference to accompanying drawings.

Figure 1:
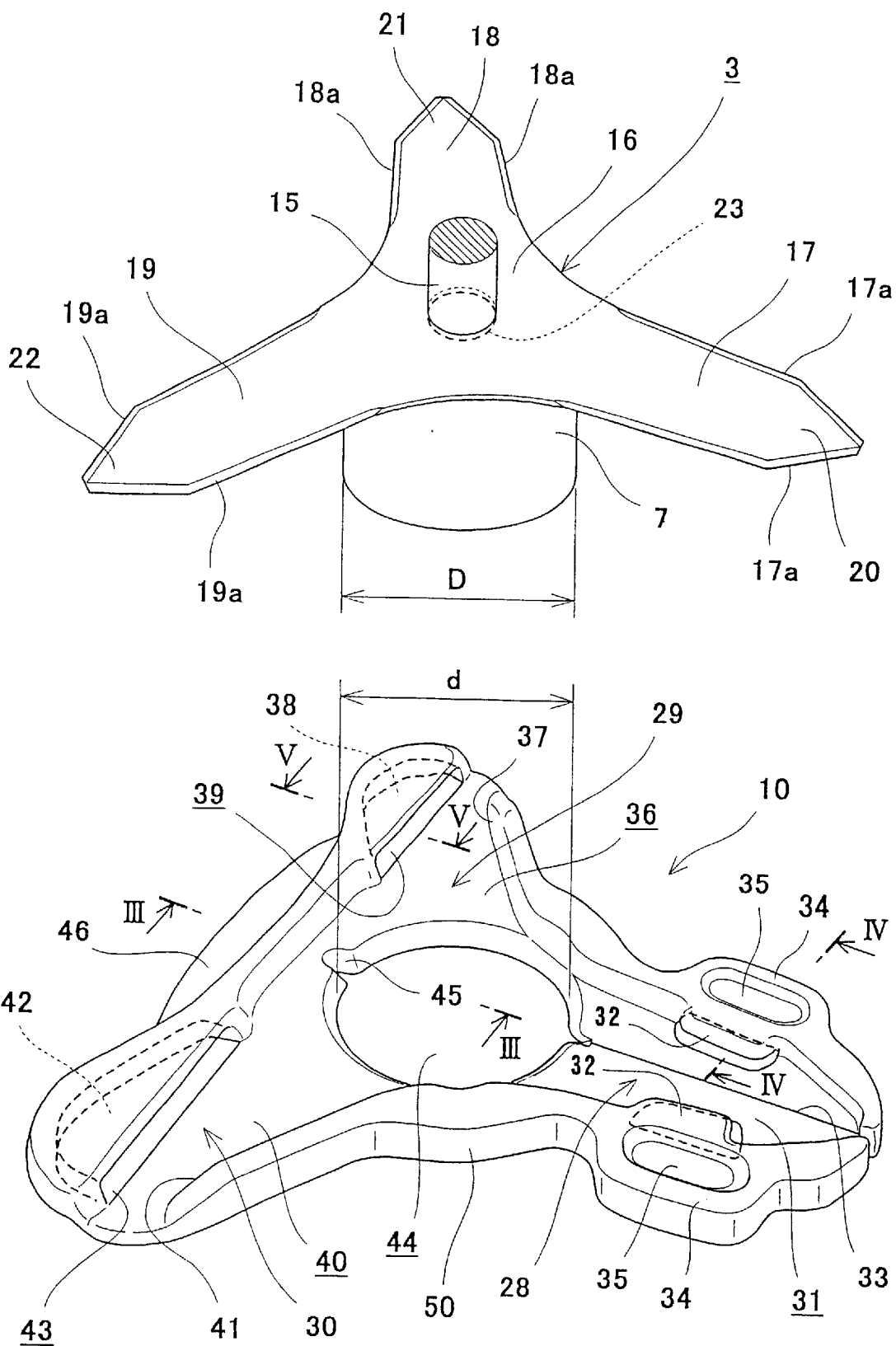
FIG. 1 is a perspective view of a cutting blade cover according to an embodiment of the present invention, showing a state in which the cutting blade cover is not attached to a cutting blade.
Figure 2:
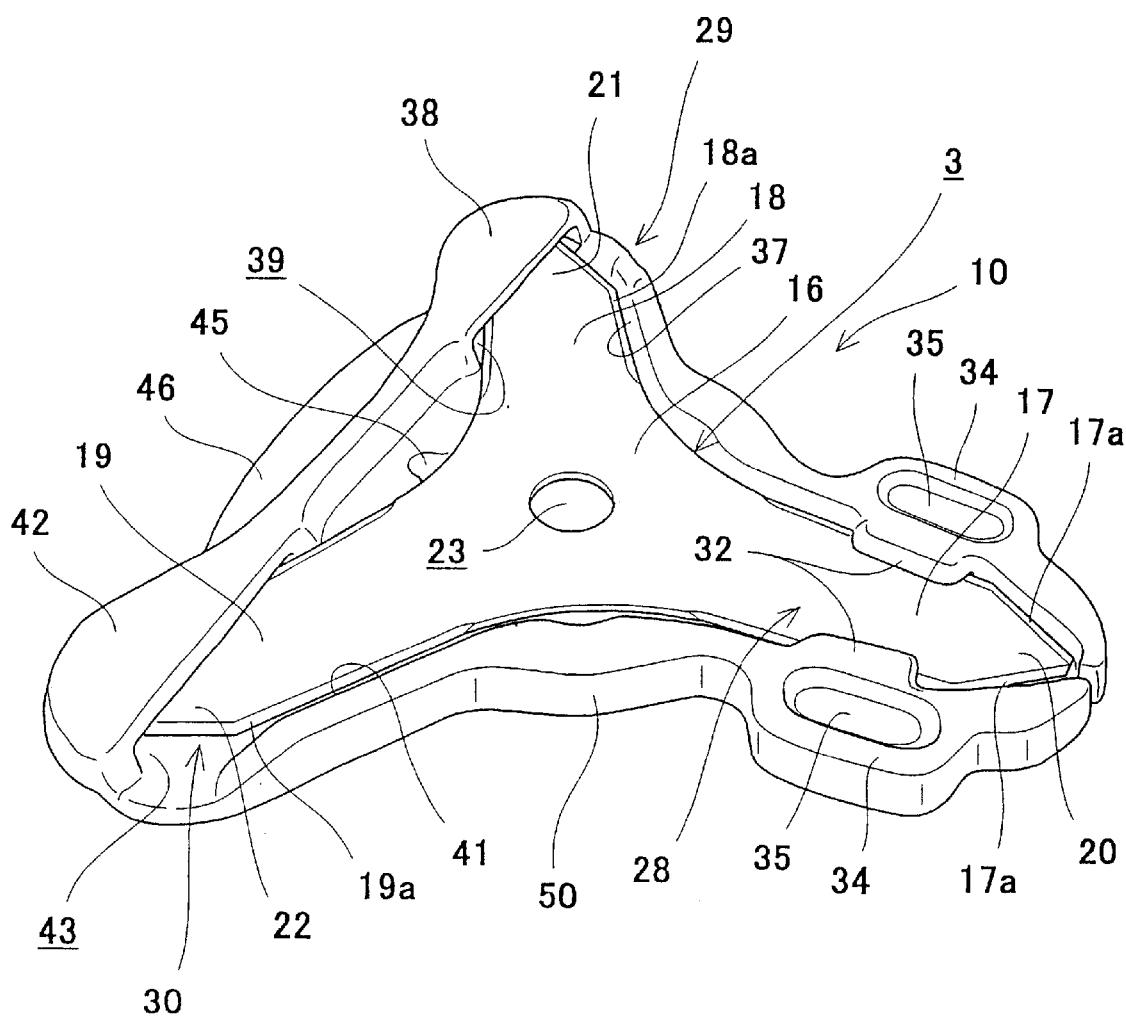
FIG. 2 is a perspective view of the cutting blade cover of FIG. 1, showing a state in which the cutting blade cover is attached to the cutting blade.
Figure 6:
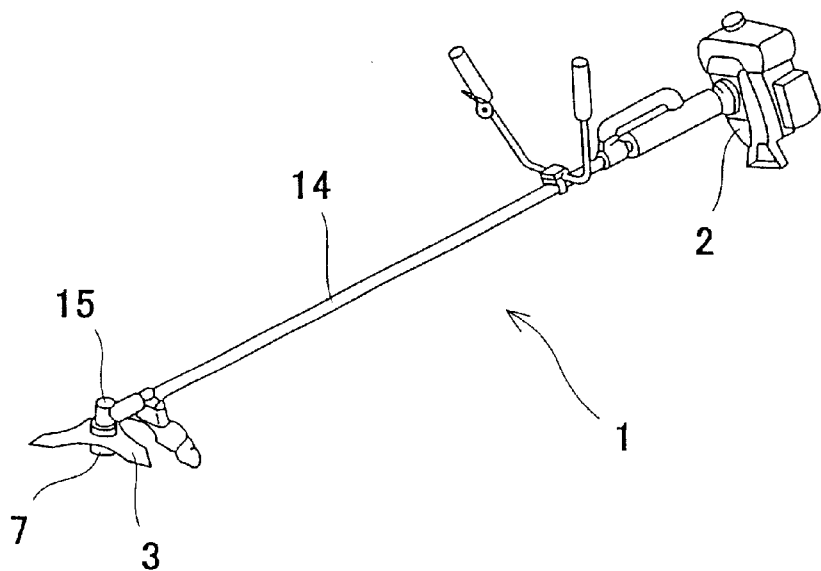
FIG. 6 is a perspective view of a brush cutter.
Figure 7:
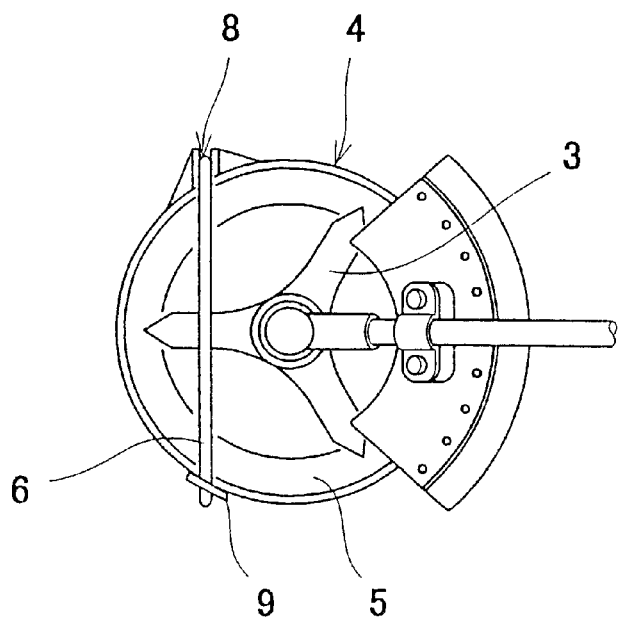
FIG. 7 is a front view of the conventional cutting blade cover, showing a state in which the cutting blade cover is attached to a cutting blade.

FIGS. 1 and 2 are perspective views of a cutting blade cover for a brush cutter(hereinafter referred to as a "cutting blade cover") 10 according to an embodiment of the present invention, wherein FIG. 1 shows the cutting blade cover 10 that is not attached to a cutting blade 3 and FIG. 2 shows the cutting blade cover 10 attached to the cutting blade 3. In FIG. 1, a rotating shaft 15 and a support cup 7 of the brush cutter 1 are shown, whereas in FIG. 2, these members are omitted. FIG. 6 is a perspective view of the brush cutter 1. Hereinafter, the preferred embodiment of the present invention will be described with reference to these Figures.

Referring now to FIGS. 1 and 2, the cutting blade cover 10 is used for the three lobe cutting blade 3 comprising a base portion 16, a first blade 17, a second blade 18, and a third blade 19. In the three lobe cutting blade 3, the first, second, and third blades 17, 18, 19 are protruded radially from the base portion 16. The cutting blade cover 10 is attached to the cutting blade 3 when the brush cutter 1 shown in FIG. 6 is transferred, carried, or stored.

The cutting blade 3 is plate shaped and the base portion 16 and the blades 17, 18, 19 are formed integrally with one another such that they are placed on an imaginary plane. The base portion 16 is the portion to be attached to the rotating shaft 15 of the brush cutter 1. The blades 17, 18, 19 are formed radially from the base portion 16 and respectively spaced an equal angle apart from one another. The tip end portions 20, 21, 22 of the blades 17, 18, 19 are respectively triangular. The blades 17, 18, 19 respectively include cutting portions 17a, 18a, 19a for cutting formed at edge portions thereof.

The base portion 16 the cutting blade 3 has a hole 23 in a central portion thereof, into which the rotating shaft 15 is inserted. With the rotating shaft 15 inserted into the hole 23, the base portion 16 is firmly fixed to the rotating shaft 15 by screw means engaging with the rotating shaft 15. Then, with the base portion 16 firmly fixed to the rotating shaft 15, the support cup 7 is attached to the rotating shaft 15 from below of the cutting blade 3.

The cutting blade cover 10 comprises a central portion 50, a first blade accommodating portion 28, a second blade accommodating portion 29, and a third blade accommodating portion 30. The first, second, and third blade accommodating portions 28, 29, 30 are provided radially from the central portion 50. The cutting blade cover 10 is made of resin and is blow molded, and the central portion 50 and the blade accommodating portions 28, 29, 30 are integrally formed. Since the role of the cutting blade cover 10 is to protect the three lobe cutting blade 3, the cover 10 is three lobe shaped to conform to an outer shape of the cutting blade 3.

The first blade accommodating portion 28 is adapted to accommodate the first blade 17. The first blade accommodating portion 28 includes a first concave portion 31 formed therein. An inner shape of the first concave portion 31 conforms to an outer shape of the first blade 17. This makes it possible that the first blade 17 is fitted into the first concave portion 31, therefore the cutting portion 17a of the first blade 17 is protected reliably.

The first blade accommodating portion 28 is provided with a pair of engagement portions 32. The engagement portions 32 are protruded inwardly of the first concave portion 31 (toward the center thereof) from edge portions thereof and placed opposite to each other. The engagement portions 32 are provided on an upper face side of the cutting blade 3 fitted into the first concave portion 31 when the cutting blade cover 10 is attached to the cutting blade 3. The engagement portions 32 prevent detachment of the cutting blade 3 from the cutting blade cover 10.

A slit 33 is formed from the first blade accommodating portion 28 to the central portion 50 such that it extends from an outer end of the first blade accommodating portion 28 to a central through hole 44 of the central portion 50. The slit 33 is provided at substantially the center of the width of the first blade accommodating portion 28 such that it extends in a longitudinal direction of the first blade accommodating portion 28 and penetrates through the first concave portion 31. The provision of the slit 33 enables the first blade accommodating portion 28 to be divided in two. The first concave portion 31 can be laterally widen because the first blade accommodating portion 28 can be divided in two in the width direction thereof.

The first blade accommodating portion 28 is provided with a pair of handles 34. The handles 34 are provided on both sides of outside of the first blade accommodating portion 28. The handles 34 are situated symmetrically with respect to the slit 33. The handles 34 are gripped and laterally pulled by operator's hands when the slit 33 is opened for division of the first blade accommodating portion 28 in two. In this embodiment, in order to make it easy for the operator's hands to grip the handles 34, the handles 34 are provided with concave portions 35 into which the operator's fingers are put. Instead of providing the concave portions 35, a number of small protrusions for non-slip may be provided on surfaces of the handles 34.

The second blade accommodating portion 29 is adapted to accommodate the second blade 18 of the cutting blade 3. The second blade accommodating portion 29 includes a second concave portion 36 formed therein. An inner shape of the second concave portion 36 conforms to an outer shape of the second blade 18. More specifically, the second blade accommodating portion 29 includes an abutment wall portion 37 and a bag-shaped portion 38 which make the second concave portion 36.

As shown in FIG. 2, with the cutting blade cover 10 attached to the cutting blade 3, the abutment wall portion 37 abuts with one side of the cutting portion 18a of the second blade 18.

The bag-shaped portion 38 has a hollow portion opened in a bottom face thereof (rear side of the cover 10 of FIG. 1). The bag-shaped portion 38 has an insertion opening 39 communicating with the hollow portion. As shown in FIG. 1, the hollow portion is adapted to accommodate the other side of the cutting portion 18a of the second blade 18. With the second blade 18 accommodated in the hollow portion, it abuts with an edge portion of the insertion opening 39. Therefore, when the second blade 18 is inserted into the second concave portion 36, it is held in the second concave portion 36 and the cutting portion 18a is protected reliably.

The third blade accommodating portion 30 is adapted to accommodate the third blade 19 of the cutting blade 3. The third blade accommodating portion 30 includes a third concave portion 40 formed therein. An inner shape of the third concave portion 40 conforms to an outer shape of the third blade 19. The third blade accommodating portion 30 is configured like the second blade accommodating portion 29 and includes an abutment wall portion 41 and a bag-shaped portion 42. The bag-shaped portion 42 has an insertion opening 43. When the third blade 19 is inserted into the third concave portion 40, it is held in the third concave portion 40 and the cutting portion 19a is protected reliably.

As shown in FIGS. 1 and 2, the second blade accommodating portion 29 and the third blade accommodating portion 30 are symmetric with respect to a center line of the first blade accommodating portion 28.

The first blade accommodating portion 28, the second blade accommodating portion 29, and the third blade accommodating portion 30 are respectively formed continuously with the central portion 50. The central portion 50 has the circular central through hole 44 formed therein. The central through hole 44 has an inner diameter d somewhat larger than an outer diameter D of the support cup 7 of the brush cutter 1. When the cutting blade cover 10 is attached to the cutting blade 3, the support cup 7 is inserted into the central through hole 44. This makes the cutting blade cover 10 closely contact with the cutting blade 3 and prevents the play of the cutting blade cover 10.

The central through hole 44 has a semicircular cutout 45 in an inner wall face thereof. The cutout 45 is formed in the inner wall face of the central through hole 44 at a position opposite to a position at which the slit 33 communicates with the central through hole 44. The cutout 45 facilitates deformation of the cutting blade cover 10 when the slit 33 is opened and the first concave portion 31 is widened.

A rib 46 is formed in a portion where the second blade accommodating portion 29 and the third blade accommodating portion 30 are continuous with each other. The rib 46 is flat-plate shaped and extends from the second blade accommodating portion 29 toward the third blade accommodating portion 30. The provision of the rib 46 improves the rigidity of the cutting blade cover 10. In addition, the rib 46 allows the slit 33 to be closed quickly when the first concave portion 31 is released from its widened state.

Figure 3:
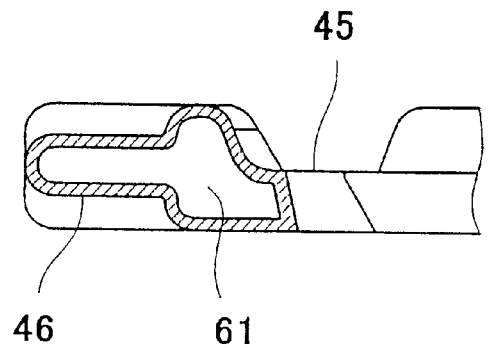
FIG. 3 is a cross-sectional view taken along line III—III of FIG. 1.
Figure 4:
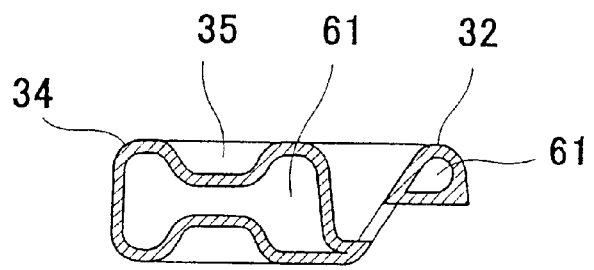
FIG. 4 is a cross-sectional view taken along line IV—IV of FIG. 1.
Figure 5:
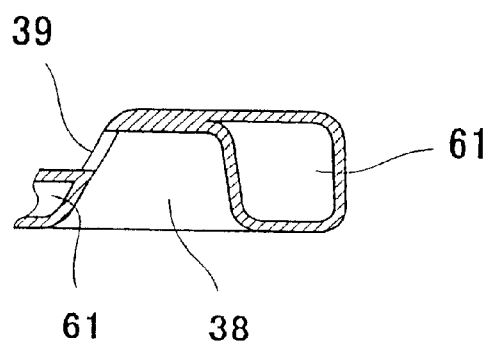
FIG. 5 is a cross-sectional view taken along line V—V of FIG. 1.

Cross-sectional shapes of main portions of the cutting blade cover 10 will now be described. FIG. 3 is a cross-sectional view taken along line III—III of FIG. 1. FIG. 4 is a cross-sectional view taken along line IV—IV of FIG. 1. FIG. 5 is a cross-sectional view taken along line V—V of FIG. 1.

Referring to these Figures, respective portions of the cutting blade cover 10 have hollow portions 61 inside thereof. These hollow portions 61 communicate with one another. Specifically, a wall forming the cutting blade cover 10 has a double wall structure to allow the hollow portions 61 to communicate with one another inside thereof. Such a structure makes it possible that the cutting blade cover 10 is integrally formed by blow molding by using resin, for example, polyethylene in this embodiment. The integral formation by blow molding provides the cutting blade cover 10 that is lightweight and superior in strength and impact absorptivity. Also, such formation provides the cutting blade cover 10 that is excellent as a commercial product because of its external appearance rounded off by blow molding.

Subsequently, how the cutting blade cover 10 of this embodiment is used will be explained in conjunction with its function.

First, holding the cutting blade cover 10, the operator grips the handles 34 and exerts a force to open the slit 33. Thereby, the first concave portion 31 is widened. In this state, the second blade 18 and the third blade 19 of the cutting blade 3 are respectively fitted into the second concave portion 36 and the third concave portion 40. In other words, the second blade 18 is inserted into the bag-shaped portion 38 through the insertion opening 39 and third blade 19 is inserted into the bag-shaped portion 42 through the insertion opening 43. Then, the first blade 17 is inserted into the first concave portion 31 and a force pulling the handles 34 is released to allow the first concave portion 31 to return to its initial state. Thereby, the first blade 17 is fitted into the first concave portion 31.

The following usage is alternatively employed. First, the second blade 18 and the third blade 19 are respectively fitted into the second concave portion 36 and the third concave portion 40. Then, the handles 34 are gripped and the slit 33 is opened to allow the first concave portion 31 to be widened. In this state, the first blade 17 is inserted into the first concave portion 31 and the force pulling the handles 34 is released to allow the first concave portion 31 to return to its initial state. Thereby, the first blade 17 is fitted into the first concave portion 31.

Since the first concave portion 31, the second concave portion 36, and the third concave portion 40 have the inner shapes respectively conforming to the outer shapes of the first blade 17, the second blade 18, and the third blade 19, the blades 17, 18, 19 can be fittingly covered by the concave portions 31, 36, 40, respectively. The cutting blade cover 10 reliably protects the cutting portions 17a, 18a, 19a of the three lobe cutting blade 3 and reliably prevents damage to the cutting portions 17a, 18a, 19a of the cutting blade 3 when the brush cutter 1 is transferred, carried, or stored. In addition, because the cutting blade cover 10 of the present invention requires no additional member for fixing it to the cutting blade unlike the conventional cutting blade cover, the structure of the cutting blade cover 10 can be simplified.

Since the cutting blade cover 10 can be attached to the cutting blade 3 by an simple operation as described above, the cutting blade cover 10 can be quickly attached/detached to/from the cutting blade 3 with the cutting blade 3 attached to the brush cutter 1.

Since the first blade accommodating portion 28 is provided with the engagement portions 32, it is required that the operator intentionally detach the cutting blade cover 10 from the cutting blade 3 while gripping the handles 34. In other words, if an unexpected force is exerted on the cutting blade cover 10 while the brush cutter 1 is carried, the cutting blade cover 10 is not easily detached from he cutting blade 3.

In this embodiment, the first blade accommodating portion 28, the second blade accommodating portion 29, the third blade accommodating portion 30, and the central portion 50 are integrally formed by blow molding. Therefore, the first concave portion 31, the second concave portion 36, and the third concave portion 40 into which the first, second, and third blades 17, 18, 19 are respectively fitted can be easily formed and the cutting blade cover 10 can be manufactured at a low cost. In particular, the outer peripheral face of the cutting blade cover 10 can be smoothed by blow molding. Consequently, the operator can easily handle the cutting blade cover 10 with his/her hands. Moreover, impact resistance of the cutting blade cover 10 can be improved by blow molding.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A cutting blade cover for a brush cutter for protecting a three lobe cutting blade including a base portion attached to a rotating shaft of the brush cutter, a first blade, a second blade, and a third blade, wherein the first, second and third blades are protruded radially from the base portion, comprising:
   a central portion having a central through hole;
   a first blade accommodating portion;
   a second blade accommodating portion; and
   a third blade accommodating portion,
      wherein the first, second, and third blade accommodating portions are provided radially from the central portion,
      a first concave portion is formed in the first blade accommodating portion and has an inner shape conforming to an outer shape of the first blade to cover an outer periphery of a cutting portion of the first blade,
      a second concave portion is formed in the second blade accommodating portion and has an inner shape conforming to an outer shape of the second blade to cover an outer periphery of a cutting portion of the second blade,
      a third concave portion is formed in the third blade accommodating portion and has an inner shape conforming to an outer shape of the third blade to cover an outer periphery of a cutting portion of the third blade, and
      the first blade accommodating portion includes a slit extending from an outer end thereof to the central through hole to widen the first concave portion.

2. The cutting blade cover according to claim 1, wherein the first blade accommodating portion is provided with a pair of engagement portions protruded inwardly of the first concave portion from a side wall face of the first concave portion and apart from a bottom wall face of the first concave portion, for holding the first blade.

3. The cutting blade cover according to claim 1, wherein the first blade accommodating portion is provided with a pair of handles on both sides of outside of the first blade accommodating portion, for opening the slit, the slit being situated between the handles.

4. The cutting blade cover according to claim 1, wherein the central through hole has a cutout formed in an inner wall face of the central through hole at a position opposite to a position at which the slit communicates with the central through hole.

5. The cutting blade cover according to claim 1, wherein the second blade accommodating portion has a bag-shaped portion at an outer end of the second concave portion, for holding the second blade.

6. The cutting blade cover according to claim 1, wherein the central portion, the first blade accommodating portion, the second blade accommodating portion, and the third blade accommodating portion are made of resin and integrally formed by blow molding.

7. The cutting blade cover according to claim 6, wherein the central portion, the first blade accommodating portion, the second blade accommodating portion, and the third blade accommodating portion respectively have hollow portions inside thereof, the hollow portions communicating with one another.

8. A cutting blade cover for a brush cutter for protecting a lobe shaped cutting blade protruding radially from a base portion, comprising:
   a central portion having a central through hole to receive said base portion;
   a blade accommodating portion extending radially from the central portion and having a concave portion conforming to an outer shape of the blade to cover an outer periphery of a cutting portion of the blade when the blade is positioned in said blade accommodating portion; and
   a slit extending from an outer end of the blade accommodating portion to the central through hole to allow temporary widening of the concave portion to facilitate positioning of the blade in the blade accommodating portion.

9. The cutting blade cover according to claim 8, wherein the blade accommodating portion is provided with a pair of engagement portions protruded inwardly of the concave portion from a side wall face of the concave portion and apart from a bottom wall face of the concave portion, for holding the blade.

10. The cutting blade cover according to claim 8, wherein the blade accommodating portion is provided with a pair of handles on both sides of outside of the blade accommodating portion, for opening the slit, the slit being situated between the handles.

11. The cutting blade cover according to claim 8, wherein the central through hole has a cutout formed in an inner wall face of the central through hole at a position opposite to a position at which the slit communicates with the central through hole.

12. The cutting blade cover according to claim 8, wherein a second blade accommodating portion is provided delivering a second concave portion to receive a second blade and has a bag-shaped portion at an outer end of the second concave portion, for holding the second blade.

13. The cutting blade cover according to claim 8, wherein the cover is made of resin and integrally formed by blow molding.

14. The cutting blade cover according to claim 13, wherein the cover has hollow portions inside thereof, the hollow portions communicating with one another.

* * * * *